United States Patent [19]
Foglein

[11] 3,820,501
[45] June 28, 1974

[54] DEVICE FOR CONVERTING MEASUREMENT FOR METRIC TO IMPERIAL SYSTEM AND VICE VERSA

[76] Inventor: Robert Foglein, 7 Kym Ave., Valley View, Adelaide, Australia 5093

[22] Filed: Mar. 13, 1973

[21] Appl. No.: 340,679

[30] Foreign Application Priority Data
Mar. 14, 1972  Australia.....................8278/72

[52] U.S. Cl................ 116/115.5, 33/166, 74/424.5, 74/813, 82/24
[51] Int. Cl.......................................... B23q 17/00
[58] Field of Search...... 235/119; 33/166; 74/424.5, 74/813; 82/24; 116/115, 115.5

[56] References Cited
UNITED STATES PATENTS
1,444,565  2/1923  Smith............................ 116/115.5
3,628,495  12/1971  Hagedorn....................... 116/115.5

FOREIGN PATENTS OR APPLICATIONS
1,904,414  8/1970  Germany........................ 116/115.5
1,133,782  11/1968  Great Britain.................. 116/115.5

Primary Examiner—Lawrence R. Franklin
Attorney, Agent, or Firm—Oldham & Oldham Co.

[57] ABSTRACT

A device for converting imperial measurements to metric measurements and vice versa and which is particularly suited to machine tools. The device has two revolving scales one for each system of measurement which are geared together so that simultaneous and instantaneous conversion takes place.

3 Claims, 2 Drawing Figures

DEVICE FOR CONVERTING MEASUREMENT FOR METRIC TO IMPERIAL SYSTEM AND VICE VERSA

This invention relates to a device for converting imperial to metric measure or vice versa and in particular it relates to a device of the type which can be used on a lathe to allow conversion of for instance a lathe cooperated in inches to be converted to metric measurement.

It is already known in the art of converting such measurements to use a member which is fixed to the rotational part of a lathe or the like and to interconnect this through a stationary member with a converting member in such a manner that rotation is shown on the one hand in inch graduations or the like and on the other hand in metric graduations.

To achieve this in the past it has been proposed to use a member which is attached to a movable part of the lathe or the like on which measurement is to be taken and to have on that member a scale which is fixed to rotate with the member but is adjustable to a zero position in relation to the member, and to couple this rotating part to another rotary scale through gearing so arranged that the correct ratio between imperial and metric for instance measurement is achieved, the second rotary scale again being adjustable to allow a zero setting to be achieved.

In this way as the one member rotates measurement is read in the one scale but as this moves the other member which has the other scale in a proportion in a direct relationship between the units of the scale, both the imperial and metric measurements are shown.

To achieve this it was proposed heretofore to use a member which we will call the driving member which was attached to the rotating part and to rotationally and coaxially mount on this a fixed member which carried the gearing whereby the ratio was achieved, the fixed member having adjacent to it a further rotational member also axially disposed which has on it the scale into which the movement is to be converted and conveniently called the driven member.

By selecting the correct ratio of geared teeth projecting on each side of the fixed member and having the teeth of one engaging internal teeth on the driver member and the other engaging internal teeth on the driven member obviously as the driver member is rotated it carries with it the driven member but at a ratio defined by the differences between the two scale systems being used.

This had the problem firstly of having to achieve an exact ratio by utilising a tooth ratio on the two sides of the gear wheel which achieves this result, and this meant that very fine teeth were required and it is for instance necessary to use 125 teeth on one side of the gear wheel and 127 teeth on the other side of the gear wheel, these fine teeth being subject to considerable wear, and also introducing considerable friction.

A further problem was the high rate of revolution of the wheel which because it had to be of relatively small diameter engaging two relatively large internal ring gears and this again added greatly to wear and also resulted in translation errors due to slack in the teeth which increased with wear.

The object of the present invention is to provide a device of this type which however rapid motion of the gear drive which translates one scale to the other is avoided and further to achieve results in a simpler and more effective manner.

According to the present invention there is provided a device comprising a rotary member adapted to be driven, the rotary member containing a skew gear engaging a worm thread on a stationary member, the skew gear driving a further gear engaging teeth on a rotary ring, the rotary member carrying a dial of one measure and the rotary ring carrying a dial of the other measure, whereby the gearing ratio between the two dials gives an instantaneous conversion of the movement imparted to the driving or rotary member.

By using a worm drive between the drive member and the driven or rotary ring member a very great improvement results in that the system of worm drive requires only a very low rate of revolution of the interconnecting members thus avoiding friction and other problems and also allowing the ratio to be achieved in a very much better manner.

A preferred embodiment of the invention will now be described with reference to the accompanying drawings in which.

Figure 1:
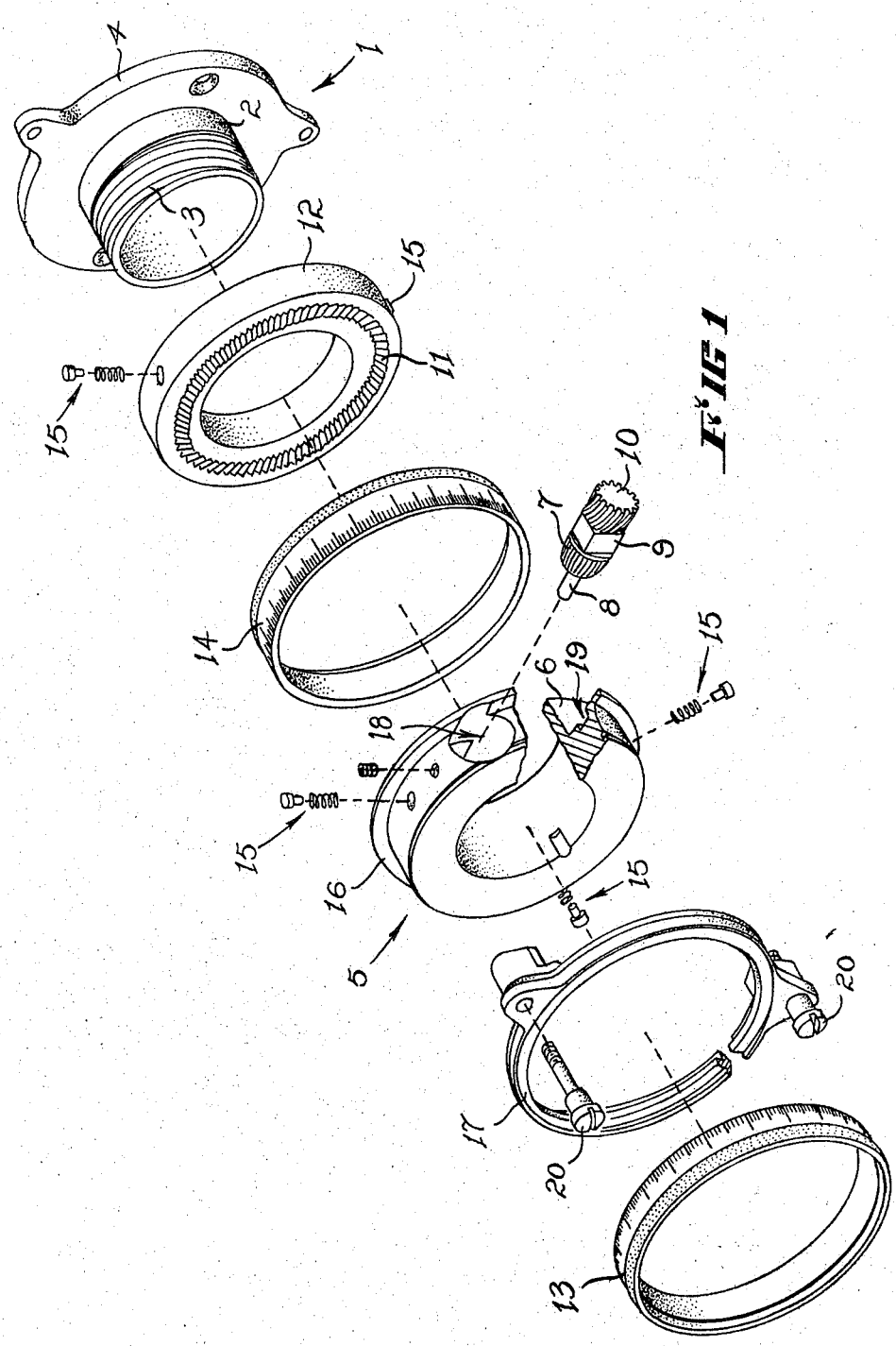
FIG. 1 is an exploded view of the device.
Figure 2:
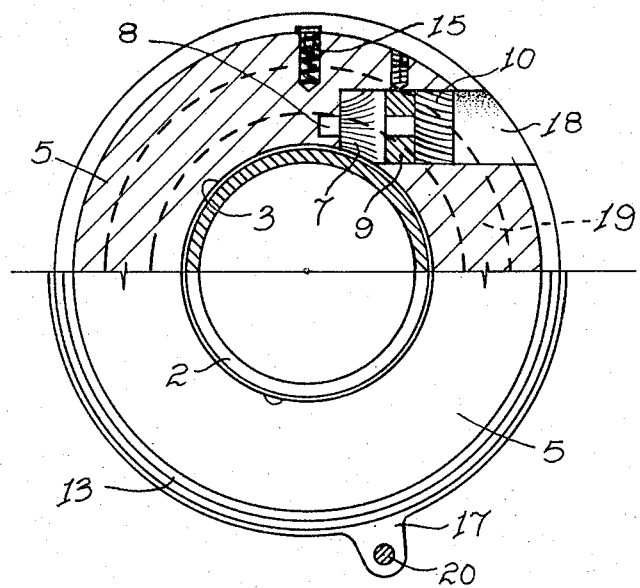
FIG. 2 is a part cross-sectional view, through the rotary body.

The device is comprised of a stationary body 1 having a cylindrical sleeve 2 having formed thereon a worm 3, the body also including a flange 4 which is adapted to be attached or located on a stationary part of a machine.

A rotary body 5 having a sleeve 6 adapted to slidably engage over the sleeve 2, surrounds the sleeve 2 and contains a tapered worm wheel 7 fixed to a shaft 8 mounted in a block 9, the shaft 8 also carries a pinion 10, the pinion gear assembly 7–10 is mounted chordwise in an aperture in the body 5 with the worm wheel 7 engaging the worm thread 3. The pinion 10 engages the teeth 11 on a crown gear 12 rotatably mounted on the sleeve 6 of the rotary body 5.

The rotary body 5 frictionally carries a calibrated ring 13 (in this embodiment calibrated in inches) and the crown gear frictionally carries a calibrated ring 14 (in this embodiment calibrated in millimeters), the frictional drive in both instances being by spring loaded friction pads 15.

In order the maintain the parts in assembled condition the rotary body 5 has a flange 16 against which an anchoring 17 can bear whilst being free to rotate relative to the body 5 between the ring 13 and flange 16, the anchoring 17 being fixed as by screws 20 to the flange 4 of the stationary body 1.

The rotary body 5 is adapted to be driven by the lead screw to which the device is attached, the ring 13 reading direct to the movement of the lead screw assuming that the lead screw is calibrated in inches and the ring 13 is in inches.

Thus as rotary movement is applied to the lead screw the rotary body 5 rotates thus causing movement of the worm wheel 7 around the stationary worm 3, the worm wheel 7 thus rotating about its own axis, thus causing rotation of the pinion 10 which meshes with the teeth 11 on the crown gear 4 thus causing rotation of the crown gear 4 and the metric ring 14 at a slow rate relative to the lead screw.

Thus if for example the lead screw of the machine has five threads per inch the lead screw would advance 0.2 inches per revolution. The inch scale 13 is thus calibrated to read from 0.0 inches to 0.2 inches around the scale thus having 200 sub-divisions around its circumference each sub-division representing 0.001 inches.

The metric scale 14 is graduated to read from 0.00 millimeters to 5.00 millimeters. However as 0.2 inches is equivalent to 5.08 millimeters and the gearing between the worm 3, worm wheel 7, pinion 10 and teeth 11 must be such that the metric ring rotates one complete revolution plus 0.08 of a millimeter for each rotation of the lead screw and the ring 13, and it is to be appreciated that this ratio can easily be calculated.

Hence due to the worm gearing arrangement the worm gearing and pinion do not rotate at high speed but have a slow rate of rotation about their axis and hence this reduces wear and maintenance costs of the device.

The worm and pinion can easily be fitted and mounted in the body 5 by drilling a hole 18 in the body 5 this hole being cordwise to the axis of the body such that the worm wheel 7 will engage the worm 3. The bearing block 9 is retained in the hole 18 by a grub screw or stud screwed into the body 5 and engaging the block 9.

A circumferential slot 19 is formed in the radial face of the body 5 in which the teeth 11 of the crown gear 12 may pass, the pinion 10 opening into this slot so that the pinion 10 can engage the teeth 11.

The device is fitted to a machine tool so that the lead screw passes through the sleeve 2 of the flange 4 which is attached to the stationary part of the machine, a bush or the like being fitted to the lead screw to be rotated therewith and to drive the rotary member 5 through means of a key or the like.

If the lead screw of the machine to which the device is to be fitted has other numbers of threads per inch such as eight threads per inch then the device can easily be changed to accommodate this and to give the correct reading by merely changing the gearing ratio of the gears and pinions.

It will be realised of course that the device can be varied considerably in construction but the principle of the invention is the use of a worm drive through a shaft which is in a plane of rotation of the device itself and so disposed that a worm transmits drive through the intermediate worm wheel and pinion to teeth on the driven member.

Obviously it is possible to use the device to operate for metric to inch scales by simply repositioning the scales themselves and variations of this type will be readily apparent to persons versed in the art.

I claim:

1. A device for indicating a conversion from imperial measure to metric measure or vice versa comprising:
    a stationary member including a cylindrical extension having a worm gear;
    a rotary ring rotatably mounted on said extension and coaxial therewith, said ring having gear teeth along one edge and having a dial around the circumference thereof, said dial bearing indicia corresponding to one of said measures;
    a rotary member coaxially mounted on said extension adjacent said ring and adapted to be rotatably driven, said rotary member having a chordwise aperture therein and having a dial around the circumference thereof, said member dial bearing indicia corresponding to the other of said measures;
    and gearing means located in said aperture including a mounting block non-rotatably secured to said member, and a shaft rotatably journaled in said block, said shaft carrying a skew gear and a pinion, said skew gear engaging said worm gear and said pinion engaging said gear teeth, whereby the rotation of said rotary member will be indicated in both imperial and metric measures.

2. A device as defined in claim 1 wherein the stationary member comprises a flange adapted to be attached to a stationary part of a machine and said extension extending therefrom, at least a portion of the external surface of the extension being formed with the worm gear thereon.

3. A device as defined in claim 1 wherein the rotary ring and the rotary member frictionally carry their respective dials so that the dials can be adjusted relative to each other as desired.

* * * * *